United States Patent [19]

Utsumi

[11] Patent Number: 5,441,800
[45] Date of Patent: * Aug. 15, 1995

[54] LAMINATED POLYESTER FILM FOR MAGNETIC TAPE

[75] Inventor: Shigeo Utsumi, Yamato, Japan

[73] Assignee: Diafoil Hoescht Company, Limited, Tokyo, Japan

[*] Notice: The portion of the term of this patent subsequent to Nov. 22, 2011 has been disclaimed.

[21] Appl. No.: 173,461

[22] Filed: Dec. 17, 1993

Related U.S. Application Data

[63] Continuation of Ser. No. 845,424, Mar. 5, 1992, abandoned.

[30] Foreign Application Priority Data

Mar. 6, 1991 [JP] Japan ................................. 3-040234

[51] Int. Cl.$^6$ ......................... B32B 27/06; G11B 5/66
[52] U.S. Cl. ................................. 428/323; 428/480; 428/694 ST; 428/694 SL; 428/694 SG; 428/910
[58] Field of Search .................. 428/694 ST, 694 SL, 428/694 SG, 480, 483, 910, 323

[56] References Cited

U.S. PATENT DOCUMENTS

| | | | |
|---|---|---|---|
| 4,687,700 | 8/1987 | Hensel et al. | 428/213 |
| 4,720,412 | 1/1988 | Katoh et al. | 428/141 |
| 4,798,759 | 1/1989 | Dallman et al. | 428/220 |
| 4,804,736 | 2/1989 | Utsumi | 528/176 |
| 4,876,137 | 10/1989 | Utsumi | 428/141 |
| 5,047,278 | 9/1991 | Ono et al. | 428/141 |
| 5,051,292 | 9/1991 | Katoh et al. | 428/141 |
| 5,069,962 | 12/1991 | Okazaki et al. | 428/323 |
| 5,318,823 | 6/1994 | Utsumi et al. | 428/143 |

FOREIGN PATENT DOCUMENTS

0312616 4/1989 European Pat. Off. .
0238985 9/1987 Germany .

*Primary Examiner*—D. S. Nakarani
*Assistant Examiner*—H. Thi Lê
*Attorney, Agent, or Firm*—Foley & Lardner

[57] ABSTRACT

A laminated polyester film for a magnetic tape, which film comprises a layer of a crystalline polyester (A) and a layer of a polyester (B) which is laminated on at least one surface of the layer of the polyester (A) and has a melting point lower than that of the polyester (A), and which film has a Young's modulus of at least 600 kg/mm$^2$ in both longitudinal and transverse directions, which film is suitable as a base film of a video tape.

22 Claims, No Drawings

LAMINATED POLYESTER FILM FOR MAGNETIC TAPE

This application is a continuation of application Ser. No. 07/845,424, filed Mar. 5, 1992 now abandoned.

BACKGROUND OF THE INVENTION

1. Field of the invention

The present invention relates to a polyester film for a magnetic tape. More particularly, the present invention relates to a polyester film which has high strength in both longitudinal and transverse directions and excellent abrasion resistance and is suitable as a base film of a magnetic tape.

2. Description of the Related Art

Hitherto, as a base film of a long-play video tape, a so-called longitudinal tensilized film has been used. Recently, with the increased need for a magnetic tape with high image quality and high resolution, a particle size of magnetic powder is decreased and magnetic powder particles are highly orientated in a magnetic layer. As a result, the magnetic layer has decreased strength in the transverse direction. In addition, since a thickness of the magnetic tape is decreased after long time recording and therefore tape stiffness is decreased, a spacing loss arises between the tape and a magnetic head so that output power tends to deteriorate and also irregularity of an envelope shape tends to appear. Further, a tape surface is smoothed and the coefficient of friction increases, resulting in tape damage. To solve the above problems, it is highly desired to increase the strength of the magnetic tape in the transverse (widthwise) direction and to provide a so-called both longitudinally and transversely tensilized film.

To produce a both longitudinally and transversely tensilized film, it is necessary to stretch or expand the film in two directions, namely in the longitudinal and transverse directions of the film. As a result, particles tend to fall and powder tends to be by abrasion. That the fallen particles and powder adhere onto the calendering roll, whereby productivity of the magnetic tapes is greatly deteriorated.

To avoid such problems of fallen particles and powder, kinds, particle sizes and amounts of the particles to be added to the film have been examined, but no satisfactory solution has been found.

SUMMARY OF THE PRESENT INVENTION

One object of the present invention is to provide a base film for a magnetic tape, which does not suffer from the problem of fallen particles and powder generated by abrasion.

Another object of the present invention is to provide a base film for a long-playing video tape.

According to the present invention, there is provided a laminated polyester film for a magnetic tape, which film comprises a layer of a crystalline polyester (A) and a layer of a polyester (B) which is laminated on at least one surface of the layer of the polyester (A) and has a melting point lower than that of the polyester (A), and which film has a Young's modulus of at least 600 kg/mm$^2$ in both longitudinal and transverse directions.

DETAILED DESCRIPTION OF THE INVENTION

The polyester (A) used in the polyester film of the present invention may be a polymer prepared through a polycondensation reaction of an aromatic dicarboxylic acid (e.g. terephthalic acid and naphthalene-2,6-dicarboxylic acid) with an aliphatic glycol (e.g. ethylene glycol, diethylene glycol, tetramethylene glycol and neopentyl glycol). Specific examples of the polyester (A) are polyethylene terephthalate (PET) and polyethylene-2,6-naphthalene dicarboxylate (PEN). In addition to a homopolymer, it is possible to use a polymer prepared through a copolymerization with an aromatic or aliphatic dicarboxylic acid or diol in such amount that the crystallinity is not decreased, for example, at most 10% by mole, preferably at most 5% by mole. Although it is possible to blend other polymers such as a polyamide, a polyolefin and a polycarbonate in an amount of not larger than 10% by weight, it is not preferable to use the other polymer in an amount such that the crystallinity is extremely decreased or the film surface is extremely roughened after the film preparation.

The polyester (B) used in the polyester film of the present invention has a lower melting point than the polyester (A). The polyester (B) is preferably a copolyester. The copolyester may be a copolymerization product having a base polyester component unit used in the polyester (A) such as an ethylene terephthalate unit and an ethylene-2,6-naphthalate unit with at least one other component unit. The copolymerizable component may be at least one dicarboxylic acid such as oxalic acid, malonic acid, succinic acid, adipic acid, azelaic acid, sebacic acid, 1,10-decane dicarboxylic acid, phthalic acid, isophthalic-acid, terephthalic-acid, naphthalene dicarboxylic acid and diphenylether dicarboxylic acid; or at least one diol such as neopentyl glycol, 1,4-butane diol, trimethylene glycol, propylene glycol, tetramethylene glycol, hexamethylene glycol, diethylene glycol, polyalkylene glycol and 1,4-cyclohexane dimethanol.

A hydroxycarboxylic acid such as p-hydroxybenzoic acid and p-hydroxyethoxybenzoic acid; a monofunctional compound such as benzoic acid, benzoylbenzoic acid and methoxypolyalkylene glycol; and a polyfunctional compound such as glycerol and pentaerythritol can be used so long as the product has a substantially straight chain.

The content of the copolymerizable component which is other than the base components of the polyester (A) and used in the polyester (B) is such that the total (T+W) of the ratio [T (% by mole)] of the carboxylic acid in such copolymerizable components to the total amount of all carboxylic acids and the ratio [W (% by mole)] of the diol component in such copolymerizable component to the total amount of all the diols is usually from 6 to 40% by mole, preferably 10 to 40% by mole. When the amount of such copolymerizable component is smaller than 6% by mole, effects on the prevention of particle drop off and the improvement of abrasion resistance are not expected. When the amount is larger than 40% by mole, the formation of the laminate film is difficult.

The polyester used in the present invention may typically contain fine particles such as an organic lubricant and inorganic lubricant to improve a sliding property. If necessary, an additive such as a stabilizer, a pigment, an antioxidant, an antifoamer and an antistatic agent may be added. Specific examples of fine particles giving the sliding property are inert external particles such as kaolin, clay, calcium carbonate, silicon oxide, spherical silica, calcium terephthalate, aluminum oxide, titanium oxide, calcium phosphate, lithium fluoride and carbon black; and internal particles formed in the polymer during the polymer preparation by a high melting point organic compound which is not meltable during the film melt preparation of the polyester resin, a crosslinked polymer and a metal compound catalyst (for example, an alkaline metal compound and an alkaline earth metal compound) used during the polyester preparation.

The polyester layer (A) does not necessarily contain the inert particles depending on the form of lamination, for example, when the polyester layer (A) is sandwiched between a pair of the polyester layers (B). If desired, the polyester layer (A) may contain the inert particles having an average particle size of 0.007 to 5 $\mu$m, in particular 0.02 to 1.5 $\mu$m in an amount of 0.001 to 1.00% by weight, preferably 0.1 to 0.8% by weight.

The average particle size of the inert particles contained in the polyester layer (B) is not limited and is preferably from 0.007 to 3.5 $\mu$m, in particular from 0.02 to 2 $\mu$m in view of film wound in good condition. The content of the particles is usually from 0.001 to 40% by weight, preferably from 0.005 to 15% by weight.

The polyester film of the present invention has a Young's modulus of at least 600 kg/mm² in both longitudinal and transverse directions. Preferably, the longitudinal Young's modulus is at least 600 Kg/mm² and the transverse Young's modulus is at least 700 kg/mm². More preferably, the Young's modulus both in the longitudinal and transverse directions is at least 700 kg/mm². In particular, the longitudinal Young's modulus is at least 700 kg/mm² and the transverse Young's modulus is at least 800 kg/mm². If the Young's modulus in either of the longitudinal and the transverse direction is less than 600 kg/mm², the film cannot be practically used.

Although the film forming method of the film according to the present invention is explained in detail, it is not limited to the following method.

In the present invention, the laminated film may be prepared by any one of the conventional methods such as coextrusion, extrusion-lamination, dry lamination and the like. Among them, coextrusion is advantageous in the preparation of a thin copolymer film and preferable in view of the productivity. Therefore, the following explanation is made by making reference to coextrusion.

The polyester (A) and polyester (B) optionally containing the inorganic particles in a suitable amount are dried using a hopper dryer, a paddle dryer, a vacuum dryer or the like, and then melted at 200 to 320° C. in separate extruders. Then, the polyesters are flowed together in a pipe or a nozzle, extruded in two layers or three layers, and quenched to prepare an unstretched film. For extrusion, a conventional method such as a T-die method and a tubular method can be used. By adjusting the flow amount in each extruder, the ratio of the thicknesses in a laminate film can be varied. When the T-die method is used to prepare the unstretched film, a film with a uniform thickness can be obtained by using a so-called electrostatic pinning method. Then, the unstretched film is stretched in longitudinal and transverse directions at a draw ratio of at least 2.0 at a temperature of from $(Tg^A-10)$ to $(Tc^A-10)$ ° C. [$Tg^A$: the glass transition temperature of the polyester (A), $Tc^A$: the crystallization temperature of the polyester (A)]. Then, the film is again successively biaxially stretched at a temperature of from $(Tg^A+10)$ to $(Tm^A-40)$ ° C. $Tm^A$ % the melting point of polyester A at a longitudinal draw ratio of from 1.05 to 2.5 and a transverse draw ratio of from 1.05 to 2.5 and then heat-set.

In the present invention, the heat set is preferably carried out at a temperature from $(Tm^B-10)$ to $Tm^A$ ° C. more preferably from $Tm^B$ to $Tm^A$ ° C. in particular from $(Tm^B+5)$ to $Tm^A$ ° C. [$Tm^B$: melting point of the polyester (B)]. When the heat set temperature is $Tm^A$ or higher, the film frequently breaks and when the temperature is lower than $(Tm^B-10)$ ° C., the film easily curls.

The heat set is usually carried out with maintaining the film in the fixed state. The film can be shrunk or tentered in the longitudinal and/or transverse directions of the film in an amount of not larger than 20% during the heat treatment or during cooling after the heat treatment.

Before, during or after the stretching steps, a corona discharge treatment can be applied to one or both of the film sides so that the adhesion property of the film to a magnetic layer and the like ise improved.

Before, during or after the stretching steps, the coating can be conducted on one or both of film sides so that the adhesion property, antistatic property, easy sliding property and light shielding property are improved.

The film prepared as stated above is wound to give a product.

Although the laminate film of the present invention is based on a two layer film consisting of layers (A) and (B), the film of the present invention may have more than two layers.

When the polyester layers (B) are laminated on both surfaces of the polyester layer (A), the kinds, particle sizes and amounts of the particles to be contained in one of the.polyester layers (B) may be the same as or different from those in the other in view of the end use of the polyester film. When they are different, one of the polyester layers (B) contains a smaller amount of the particles, for example, 0.007 to 0.5% by weight, while the other contains a larger amount of the particles, for example, 0.5 to 15% by weight. Such film can be used as a base film of a magnetic tape having no back coating.

The ratio (t/d) of the thickness (t) of the layer (B) to the average particle size (d) of the inert particles in the layer (B) is preferably from 0.1 to 10, more preferably from 0.2 to 2.0, most preferably from 0.3 to 1.0. When the value of t/d is outside the above range, the rolled form of the rolled product of the film tends to be unsatisfactory.

The degree of planar orientation $\Delta P$ of the polyster (B) layre is not larger than 0.100, preferably not larger than 0.050, more preferably not larger than 0.030, most preferably not larger than 0.010. When the $\Delta P$ is larger than 0.100, the film has poor abrasion resistance.

The thickness of the polyester layer (B) is usually 5 $\mu$m or less, preferably from 0.005 to 2 $\mu$m, more preferably from 0.01 to 1 $\mu$m, in particular from 0.01 to 0.7 $\mu$m. When the thickness of the polyester layer (B) exceeds 5 $\mu$m, the strength of the polyester film decreases.

PREFERRED EMBODIMENT OF THE INVENTION

The present invention will be illustrated by the following examples which do not limit the present invention.

In the Examples, the properties of the film were measured as follows:

1. Melting point (Tm)

Using DSC-1 manufactured by Perkin Elmer Corp., an endothermic peak temperature corresponding to crystal melting at a heating rate of 16° C./min was measured and defined as the melting point.

2. Young's modulus

Using Tensilon OTM-II (manufactured by Toyo Boldwin), the Young's modulus of the film was measured at 25° C., 50%RH under the following conditions:
  Sample shape: Rectangular (length of 15 cm, width of 1 cm)
  Chuck distance: 10 cm
  Pulling rate: 100%/sec.

3. Amount of generated white powder

White powder adhered to a feed roller in a rolling instrument for a stretched film was visually observed and evaluated as follows:
  Good: No generation of white powder
  Fair: Slight generation of white powder
  Bad: Much generation of white powder 4. Contamination of a calendering roller The contamination degree of a roller surface contacting the base film was evaluated using a five step miniature supercalender. The supercalender was a five-step calender consisting of mirror finished metal rollers and polyester composite resin rollers. In each roller, the temperature was fixed at 95° C., a line pressure was fixed at 250 kg/cm and a travel velocity was fixed at 80 m/min. The magnetic tape of 5000 m was repeatedly traveled seven times, and white powder adhered to the resin roller was visually evaluated as follows:
  Good: Substantially no adhesion of white powder to the resin roller
  Fair: Slight adhesion of white powder
  Bad: Apparent adhesion of white powder 5. Surface roughness By the use of a surface roughness tester (SE-3FK manufactured by Kosaka Kenkyusho, Ltd.), the center line average roughness was measured according to JIS B-0601-1976, with necessary modifications. The measuring conditions were the use of a contact needle having a tip radius of 2 $\mu$m, 30 mg of probe contact pressure, 80 $\mu$m of cutoff, and 2.5 mm of a measuring length.

The measurement was performed at 10 points on the film and the measured values were averaged. The average was reported in the Table.

6. Coefficient of dynamic friction against metal pin

Around a fixed hard chromium plated metal roll having a diameter of 6 mm, a film was contacted at a winding angle of 135° (8). While applying a load of 53 g ($T_2$) to one end of the film, the film was moved at a rate of 1.m/min. and the resistance ($T_1$ g) at the other end was measured. The coefficient of friction during moving ($\mu d$) was calculated according to the following formula:

$$\mu d = \frac{1}{\theta} \ln (T_1/T_2) = 0.424 \ln (T_1/53)$$

Comparative Example 1

(Preparation of polyester)

Terephthalic acid (87 parts by weight) was esterified with ethylene glycol (42 parts by weight) under an atmospheric pressure at 260° C. in the presence of bis-($\beta$-hydroxyethyl) terephthalateoligomer (100 parts by weight) to prepare a polyester oligomer having an esterification rate of 97%. Then, an ethylene glycol slurry of spherical silica particles having an average particle size of 0.3 $\mu$m was added in an amount of 0.35% by weight based on the polyester. Then, ethyl acid phosphate (0.014 part by weight), antimony trioxide (0.022 part by weight) and magnesium acetate (0.086 part by weight) were added to perform a polycondensation reaction so as to prepare a polyester having an intrinsic viscosity of 0.660 (polyester (I)).

(Preparation of film)

The polyester (I) was dried and extruded at 295° C. by an extruder to prepare a sheet and an amorphous sheet was prepared by the-electrostatic pinning cooling method.

The resultant amorphous sheet was first 2.5 stretched at a ratio of 2.5 at 100° C. in the longitudinal direction, and then stretched at a ratio of 1.8 at 90° C. in the same direction. Then, the sheet was at a ratio of 3.62 stretched at 105° C. in the transverse direction, and again at a ratio of 1.06 at 125° C. in the longitudinal direction and at a ratio of 1.32 at 190° C. in the transverse direction, followed by heat setting at 220° C. to obtain a film having a thickness of 10 $\mu$m.

Examples 1 and 2

For the polyester (B), a polyester copolymer (II) was used in which the dicarboxylic acid component consisted of 80 mole % of a terephthalic acid units and 20 mole % of isophthalic acid units, and in which the diol component consisted of 100 mole % of ethylene glycol units, and which contained the same spherical silica particles as used in Comparative Example 1 and had an intrinsic viscosity of 0.70.

The polyesters (I) and (II) were dried and melted in separate extruders at 287° C., flowed together in a pipe and coextruded in the form of a laminate consisting of an inner layer of the polyester (I) and outer layers of the polyester (II), followed by quenching to obtain an unstretched film.

The unstretched film was stretched in the manner as in Comparative Example 1 to obtain a film having a thickness of 10 $\mu$m. The film consisted of three layers having thicknesses of 0.1 $\mu$m, 9.8 $\mu$m and 0.1 $\mu$m (Example 1) or 0.05 $\mu$m, 9.9 $\mu$m and 0.05 $\mu$m (Example 2).

On one surface of the obtained film, a magnetic paint was coated to fabricate a magnetic tape. In the calendering step, no white powder was generated and the magnetic tape had good properties.

Comparative Example 2

(Preparation of polyethylene naphthalate)

In a reactor, dimethyl naphthalene-2,6-dicarboxylate (100 parts by weight), ethylene glycol (60 parts by weight) and calcium acetate monohydrate (0.1 part by weight) were charged to carry out transesterification. That is, a reaction temperature was gradually raised from the initial reaction temperature of 180° C. to 230° C. over 4 hours with evaporating off methanol to complete the transesterification.

After adding phosphoric acid (0.04 part by weight), titanium oxide having an average particle size of 0.3 $\mu$m (0.40 part by weight) and antimony trioxide (0.04 part by weight) were added to initiate the polycondensation reaction. That is, the temperature was gradually raised to 290° C. while the pressure was gradually decreased from the atmospheric pressure to 0.3 mmHg.

After 4 hours from the start of the reaction, the polycondensation reaction was terminated, and polyethylene naphthalate was discharged in a nitrogen atmosphere. The polymer melt as such was filtered through a filter corresponding 2500 mesh directly connected to an extruder and then extruded in a strand form and cut to obtain chips (polymer raw material (III)), which had an intrinsic viscosity of 0.68.

(Preparation of polyethylene naphthalate film)

The above raw material (III) was dried and extruded at 295° C. by an extruder to prepare a sheet, and an amorphous sheet was prepared by the electrostatic pinning cooling method. In the above steps, the polymer was filtered through a two-step filter corresponding to 2000 mesh and 2500 mesh.

The amorphous film was stretched at a ratio of 3.0 at 135° C. in the longitudinal direction and then at a ratio of 3.95 at 135° C. in the transverse direction. The biaxially stretched film was again 1.40 times stretched at 138° C. the longitudinal direction and then 1.22 times at 209° C. in the transverse direction. The stretched film was heat set at 239° C. to obtain a film having a thickness of 7.0 μm.

EXAMPLE 3

In the same manner as in Example 1 except the polyester (B), contains titanium oxide having an average particle size of 0.3 μm in place of the spherical silica particles this polyester (B) is designated polyester (IV).

The polyester of Comparative Example 2 (polyester (III)) and the above polyester (IV) were dried and melted in separate extruders at 295° C. and 287° C., respectively. Then, they were flowed together in the pipe and coextruded and quenched to obtain an unstretched film.

The unstretched film was stretched in the same manner as in Comparative Example 2 to obtain a film having a thickness of 7.0 μm. The thicknesses of the layers of the polyester (III) and the polyester (IV) were 0.05 μm and 6.95 μm, respectively. In the stretching steps, the surface which contacted to the stretching rolls was that of the layer of the polyester (IV).

After forming a magnetic layer on the polyester layer (IV), the film was calendered. No white powder adhered to the calendering roll, and the magnetic tape had good properties.

The results are summarized in the Table.

TABLE

| Example No. | C. 1 | E. 1 | E. 2 | C. 2 | E. 3 |
| --- | --- | --- | --- | --- | --- |
| Young's modulus (kg/mm$^2$) | | | | | |
| Longitudinal | 650 | 630 | 640 | 730 | 720 |
| Transverse | 650 | 630 | 635 | 830 | 810 |
| Thickness of layer (B) (μm) | — | 0.1 | 0.05 | — | 0.05 |
| Melting point | | | | | |
| $Tm^A$ (°C.) | 260 | 260 | 260 | 272 | 272 |
| $Tm^B$ (°C.) | — | 218 | 218 | — | 218 |
| Heat set temp. (°C.) | 220 | 220 | 220 | 239 | 239 |
| Curling | No | No | No | No | No |
| Δ P of layer (B) (× 10$^2$) | — | 5 | 3 | — | 0 |
| Ra (μm) | | | | | |
| On magnetic layer | 0.011 | 0.012 | 0.013 | 0.012 | 0.012 |
| On non-magnetic layer | 0.011 | 0.012 | 0.013 | 0.012 | 0.013 |
| μd | | | | | |
| On magnetic layer | 0.40 | 0.38 | 0.37 | 0.42 | 0.42 |
| On non-magnetic layer | 0.40 | 0.48 | 0.37 | 0.42 | 0.40 |
| Generation of white powder on non-magnetic layer | Bad | Good | Good | Bad | Good |
| Contamination of calendering roller | Bad | Good | Good | Bad | Good |

What is claimed is:

1. A laminated polyester film for a magnetic tape, comprising a layer of a crystalline polyester (A) and a layer of a polyester (B) which is laminated on at least one surface of the layer of the polyester (A), wherein said polyester (B) has a melting point lower than that of said polyester (A), said film having a Young's modulus of at least 600 kg/mm$^2$ in both longitudinal and transverse directions, and wherein said layer of polyester (B) has a planar orientation of not greater than 0.050.

2. The laminated polyester film according to claim 1, wherein the polyester (A) is a polymer prepared through a polycondensation reaction of an aromatic dicarboxylic acid with an aliphatic glycol.

3. The laminated polyester film according to claim 2, wherein the polyester (A) is one selected from the group consisting of polyethylene terephthalate (PET) and polyethylene-2,6-naphthalene dicarboxylate (PEN).

4. The laminated polyester film according to claim 1, wherein the polyester (B) is a copolyester which is a copolymerization product of a base polyester component unit used in the polyester (A) with at least one other component;

wherein the total mole % of each of the carboxylic portions and diol portions of said at least one other component is from 6–40%, respectively, based on the total mole % of each of the carboxylic portions and diol portions of said polyester (B).

5. The laminated polyester film according to claim 1, wherein the Young's modulus in the longitudinal direction is at least 600 Kg/mm$^2$ and the Young's modulus in the transverse direction is at least 700 kg/mm$^2$.

6. The laminated polyester film according to claim 1, wherein the Young's modulus both in the longitudinal and transverse directions is at least 700 kg/mm$^2$.

7. The laminated polyester film according to claim 1, wherein the Young's modulus in the longitudinal direction is at least 700 kg/mm$^2$ and the Young's modulus in the transverse direction is at least 800 kg/mm$^2$.

8. A laminated polyester film according to claim 1, wherein the layer of polyester (B) contains inert particles.

9. A laminated polyester film according to claim 8, wherein the inert particles have an average size of 0.007 to 3.5 microns.

10. A laminated polyester film according to claim 8, wherein a ratio of a thickness of the layer of polyester (B) to the average size of the inert particles is between 0.1 and 10.

11. A laminated polyester film according to claim 8, wherein a ratio of a thickness of the layer of polyester (B) to the average size of the inert particles is between 0.3 and 1.0.

12. A laminated polyester film according to claim 8, wherein said planar orientation is not greater than 0.03.

13. A laminated polyester film according to claim 1, wherein said planar orientation is not greater than 0.03.

14. A laminated polyester film according to claim 1, comprising a layer of polyester (B) laminated on each side of the layer of polyester (A).

15. A laminated polyester film according to claim 14, wherein both layers of polyester (B) contain inert particles having an average size of 0.007 to 3.5 microns and wherein the layer of polyester (A) does not contain particles.

16. A laminated polyester film according to claim 15, wherein the inert particles contained in the two layers of polyester (B) are the same in kind, size and amount.

17. A laminated polyester film according to claim 15, wherein one of the layers of polyester (B) contains from 0.007 to 0.5% by weight of inert particles and the other layer of polyester (B) contains from 0.5 to 15% by weight of inert particles.

18. A laminated polyester film according to claim 1, further comprising a magnetic layer on the polyester layer (B).

19. A laminated polyester film according to claim 1, wherein the polyester (B) is a copolyester formed from two different dicarboxylic acids and/or two different glycols.

20. A laminated polyester film according to claim 19, wherein the copolyester is formed from two glycols selected from the group consisting of ethylene glycol, diethylene glycol, tetramethylene glycol, neopentyl glycol, 1,4-butane diol, trimethylene glycol, propylene glycol, hexamethylene glycol, polyalkylene glycol and 1,4-cyclohexane dimethanol and/or two dicarboxylic acids selected from the group consisting of terephthalic acid, naphthalene dicarboxylic acid, oxalic acid, malonic acid, succinic acid, adipic acid, azelaic acid, sebacic acid, 1,10-decane dicarboxylic acid, phthalic acid, diphenylether dicarboxylic acid, and isophthalic acid.

21. A laminated polyester film according to claim 20, wherein the copolyester is formed from an ethylene glycol and one or both of terephthalic acid and naphthalene dicarboxylic acid and at least one additional glycol or acid selected from the group consisting of oxalic acid, malonic acid, succinic acid, adipic acid, azelaic acid, sebacic acid, 1,10-decane dicarboxylic acid, phthalic acid, isophthalic acid, diphenylether dicarboxylic acid, diethylene glycol, tetramethylene glycol, neopentyl glycol, 1,4-butane diol, trimethylene glycol, propylene glycol, hexamethylene glycol, polyalkylene glycol, and 1,4-cyclohexane dimethanol.

22. A laminated polyester film for a magnetic tape, comprising:
    a layer of a crystalline polyester (A), and
    a layer of a polyester (B) laminated on at least one surface of the layer of the polyester (A), the polyester (B) having a melting point lower than that of the polyester (A),
    said film having a Young's modulus of at least 600 kg/mm$^2$ in both longitudinal and transverse directions.

* * * * *

UNITED STATES PATENT AND TRADEMARK OFFICE
CERTIFICATE OF CORRECTION

PATENT NO. : 5,441,800
DATED : August 15, 1995
INVENTOR(S) : Shigeo UTSUMI

It is certified that error appears in the above-identified patent and that said Letters Patent is hereby corrected as shown below:

On the title page item [*] Notice, wherein "Nov. 22, 2011" should read --March 5, 2012--.

Signed and Sealed this

Thirty-first Day of August, 1999

Attest:

Q. TODD DICKINSON

*Attesting Officer*          *Acting Commissioner of Patents and Trademarks*